(12) United States Patent
Frome et al.

(10) Patent No.: US 9,195,987 B2
(45) Date of Patent: Nov. 24, 2015

(54) SYSTEMS AND METHODS OF CORRELATING BUSINESS INFORMATION TO DETERMINE SPAM, CLOSED BUSINESSES, AND RANKING SIGNALS

(75) Inventors: Andrea Frome, Berkeley, CA (US); Howard Wellington Trickey, Westfield, NJ (US); Melanie Clements, Jersey City, NJ (US); Ethan G. Russell, Jersey City, NJ (US); Paul Eastlund, Mamaroneck, NY (US); Diego Ariel Gertzenstein, Sudbury, MA (US); Douglas Richard Grundman, Rosemont, PA (US); Baris Yuksel, New York, NY (US)

(73) Assignee: Google Inc., Mountain View, CA (US)

( * ) Notice: Subject to any disclaimer, the term of this patent is extended or adjusted under 35 U.S.C. 154(b) by 886 days.

(21) Appl. No.: 13/034,095

(22) Filed: Feb. 24, 2011

(65) Prior Publication Data

US 2015/0154607 A1    Jun. 4, 2015

(51) Int. Cl.
*G06K 9/62* (2006.01)
*G06Q 30/00* (2012.01)

(52) U.S. Cl.
CPC .................................. *G06Q 30/018* (2013.01)

(58) Field of Classification Search
CPC .......... G06F 17/30241; G06F 17/3087; G06F 17/30247; G06F 17/30256; G06Q 30/018; G06Q 30/00; G01C 21/3644; G01C 21/3647; G01C 11/06; G01C 21/3679; G06K 9/00671; G06K 9/00704; G06K 9/62
USPC ................ 382/209, 112, 182, 190, 219, 220; 707/666, 724, 725, 732, 735–737; 348/231.5; 705/14.26, 14.47, 38, 39, 705/44, 317
See application file for complete search history.

(56) References Cited

U.S. PATENT DOCUMENTS

| 8,060,302 | B2 * | 11/2011 | Epshtein et al. ............... 701/438 |
| 8,175,794 | B1 * | 5/2012 | Szybalski ...................... 701/454 |
| 2006/0155761 | A1 * | 7/2006 | Van De Sluis et al. .... 707/104.1 |
| 2009/0210416 | A1 * | 8/2009 | Bennett ............................ 707/5 |

\* cited by examiner

*Primary Examiner* — Kim Vu
*Assistant Examiner* — Michael Vanchy, Jr.
(74) *Attorney, Agent, or Firm* — Lerner, David, Littenberg, Krumholz & Mentlik, LLP

(57) ABSTRACT

Systems and methods are provided for determining whether given business listings are spam or are closed businesses. In one example, a system receives a business listing from a user. The business listing contains a geolocation and the name of a business. The system also receives one or more street level images related to a geographic object that is at or near the same geolocation as the business listing. The system determines if the business listing is spam or is closed based on the received street level images by determining if the geographic object is the business or by analyzing whether the business associated with the listing is shown in any of the street level images.

18 Claims, 6 Drawing Sheets

SYSTEMS AND METHODS OF CORRELATING BUSINESS INFORMATION TO DETERMINE SPAM, CLOSED BUSINESSES, AND RANKING SIGNALS

BACKGROUND OF THE INVENTION

The present invention relates generally to filtering and ranking geographic object listings. More particularly, aspects of the invention relate to detecting spam or closed businesses in business listings.

Online services provide business listings to end users through various applications such as maps, search results or location-based services. These services receive inputs from business owners regarding the business's name, address, contact numbers, web site and geolocation data (latitude/longitude) and other information about the business. Such listings may include undesirable data such as spam (fake listings for businesses that do not exist) and closed businesses, which can be misleading to the user.

Street level images of geographic locations may be displayed through map services. These images typically comprise photographs of buildings, surrounding neighborhoods, and other features to allow a user to view a geographic location from a person's perspective as compared to a top-down satellite or aerial perspective. Images showing a particular geographic location, such as a museum, a gourmet shop, a restaurant or other point of interest may be displayed to the users within a mapping application to enhance the user's experience. The storefronts or business signs of some of the business listings may be visible from street level images of the neighborhood area.

SUMMARY OF THE INVENTION

Aspects of the invention provide systems and methods of detecting spam and closed businesses using viewcodes, which provide a correspondence between a point of interest and a geolocated image. Other aspects use viewcodes to rank business listings relative to one another and to decide which businesses to present for prominent display on a map.

In one embodiment of the invention, a method for determining if a business listing is a valid business listing is provided. The method comprises receiving a business listing that contains geolocation information and the name of a business, and receiving an image related to a geographic object initially associated with the business listing. The method also comprises verifying, with a processor, if the geographic object is actually associated with the business by comparing the geolocation information of the business listing with location information of the image; and if the business listing is not associated with the location information of the image, determining with the processor that the business listing is spam or is a closed business.

In one example, the method comprises receiving timing information related to the image, where the timing information includes a time when the image was captured.

In another example, the method comprises receiving an originating time of the business that identifies when the business was set up at an address indicated by the geolocation information of the business listing, and the determining includes comparing if the originating time is after the time when the image was captured.

In a further example, the method comprises assigning a confidence value to the verification; and decreasing the confidence value as a time span from when the image was captured increases; and wherein the business listing is determined to be spam or is closed based on the decreased confidence value.

In one alternative, decreasing the confidence value comprises decreasing based on a fixed predetermined value, and decreasing based on an exponential decay.

In another alternative, the method comprises adjusting a score of an account related the business listing, wherein the adjusting is performed based on the determination that the business listing is spam or is a closed business and if one or more other business listings received from the account have been identified to be spam or closed businesses; and transmitting information regarding the account to a user device based on the adjusted score, where the transmitted information comprises a notification to a user to remove any business listings determined to be spam or closed businesses, a locking or a shutting down of the account.

In another embodiment of the invention, a method for determining if a business listing is a valid business listing is provided. The method comprising receiving a business listing that contains geolocation information and the name of a business; receiving one or more images, each respective image including a geographic object in the image; constructing a viewcode for each respective one of the received images, the viewcode is a data structure comprising at least an identifier of the geographic object and location information of the respective image. The method also comprises searching, with a processor, among the constructed viewcodes for a first viewcode, where the identifier of the first viewcode indicates that the geographic object is the business and the location information of the image is related to the geolocation information of the business. The method further comprises, if the first viewcode is found, determining with the processor that the business listing is valid or is an open business; and if the first viewcode is not found, determining with the processor that the business listing is invalid or is a closed business.

In one example, the method comprises finding, with the processor, the first viewcode, where the identifier of the first viewcode indicates that the geographic object is actually another and different business listing; and determining that the other, different business listing is valid or is an open business. The location information of the image indicates a geolocation at or near the geolocation of the business, and the viewcode further includes timing information of the image, the timing information including a time when the image was captured.

In another example, the method comprises receiving an originating time of the business indicating when the business was set up at an address indicated by the geolocation information; and wherein the determining includes comparing if the originating time is later than the time when the image was captured.

In a further example, the method comprises generating a weighting factor based on a type of the business listing; and determining if the business listing is either valid or spam, and is either an open business or a closed business, based on the weighting factor. The method also comprises modifying the determination based on the weighting factor.

In a further embodiment of the invention, a method for ranking a plurality of business listings is provided. Each of the plurality of business listings containing geolocation information and a name of a business. The method comprising, for each respective one of the plurality of business listings, receiving one or more images related to a geographic object, the geographic object being at or near a geolocation of the respective business listing; identifying, with a processor, if the geographic object is the business; determining, when the geographic object is identified as the business, a vantage point from which the business was brought into view of the one or more images; ranking the business listings based on the determination; and storing the ranked business listings in a database.

In yet another embodiment of the invention, a system for determining if a business listing is spam is provided. The system comprises a processor and a memory coupled to the processor. The memory stores instructions executable by the processor. The instructions comprises instructions for receiving a business listing that contains geolocation information and the name of a business; receiving an image related to a geographic object initially associated with the business listing; verifying if the geographic object is actually associated with the business by comparing the geolocation information of the business listing with location information of the image; and if the business listing is not associated with the location information of the image, determining with the processor that the business listing is spam or is a closed business.

In one example, the system comprises instructions for receiving timing information related to the image, the timing information includes a time when the image was captured; and receiving an originating time of the business, wherein the originating time is the time when the business was set up at an address indicated by the geolocation information of the business listing.

In another example, the instructions for determining further comprising instructions for comparing if the originating time is after the time when the image was captured.

In a further example, the system comprises instructions for assigning a confidence value to the verification; decreasing the confidence value as time span from when the image was captured increases; and wherein if the business listing is determined to be spam or is closed based on the confidence value. Decreasing the confidence value comprises decreasing based on a fixed predetermined value, and decreasing based on an exponential curve.

In one alternative, the system comprises instructions for adjusting a score of an account related to the business listing, wherein the adjusting is performed based on the determination that the business listing is spam or is a closed business and if one or more other business listings received from the account have been identified to be spam or closed businesses; and transmitting information regarding the account to a user device based on the adjusted score.

In another alternative, the transmitted information comprises a notification to a user to remove any business listings determined to be spam or closed businesses, and a locking or a shutting down of the account.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, a system determines whether a business listing is spam, or whether the business is no longer at a given location. In one example, the system receives a business listing from a user. The business listing contains the geolocation and the name of a business. The system also receives one or more street level images related to a geographic object that is on the same geolocation as the business listing. The system determines if the business listing is spam or if the business is closed based on the received street level images by determining if the geographic object is the business.

Figure 1:
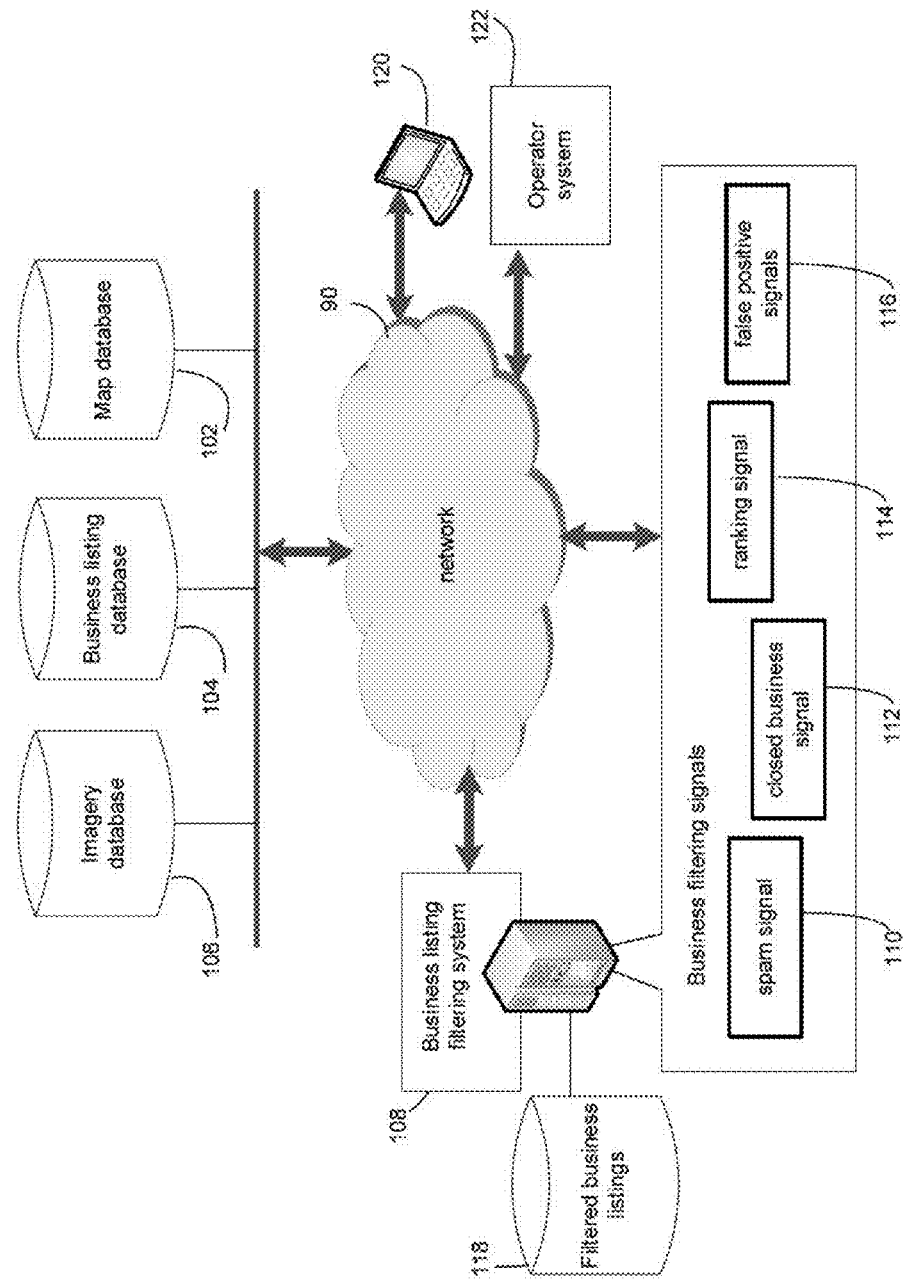
FIG. 1 is a functional diagram of a system in accordance with aspects of the invention.
Figure 2:
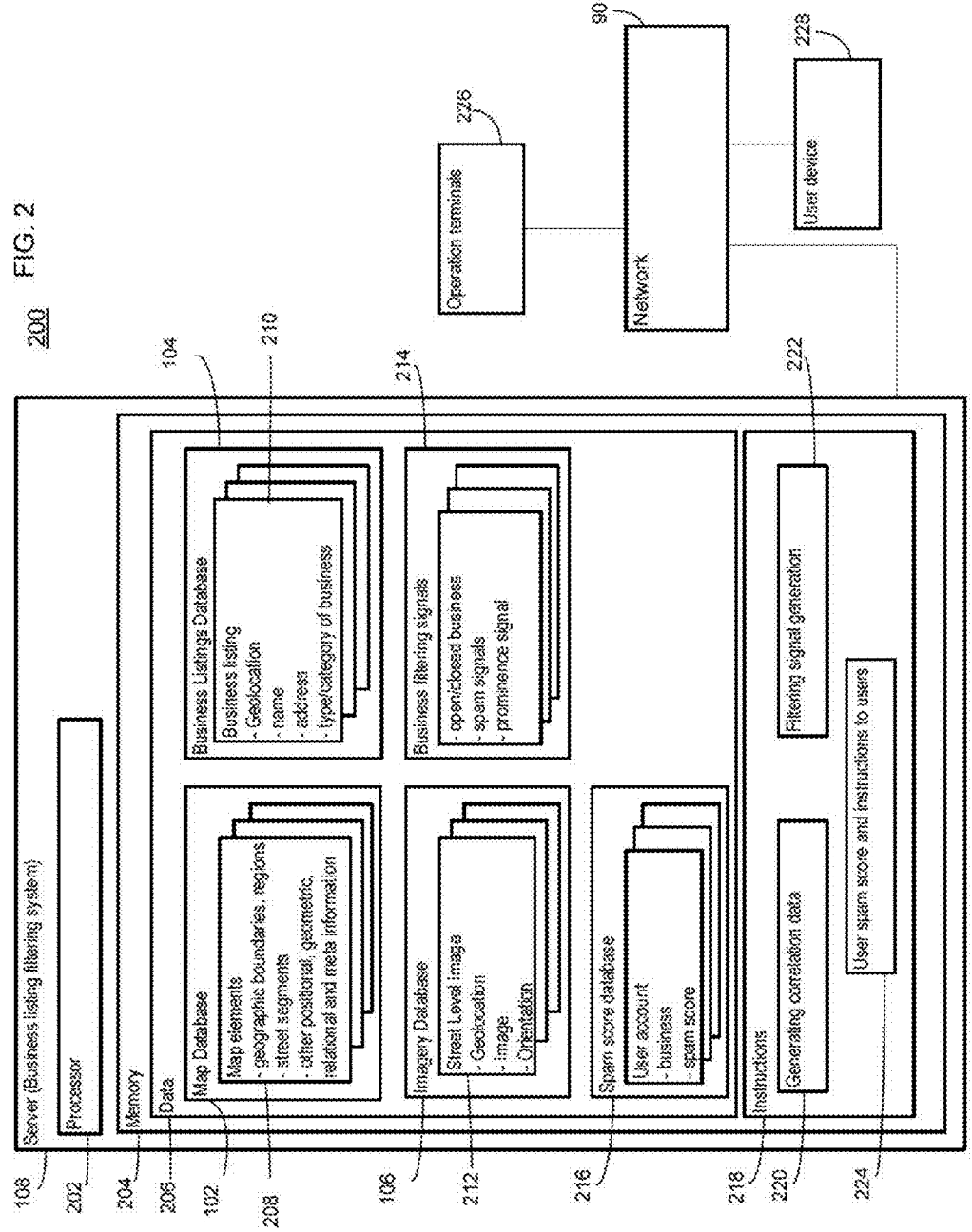
FIG. 2 is another functional diagram of aspects of the system of FIG. 1.

As shown in FIG. 1, a system 100 in accordance with aspects of the invention includes one or more databases 102, 104, 106 and 118, a business listing filtering system 108 that generates one or more signals 110, 112, 114 and 116 for filtering business, one or more user devices 120, an operator system 122, and a network 90 that interconnects these databases, servers, user devices and operator systems. As illustrated in FIGS. 1 and 2, business listing filtering system 108 may be a computer server, and databases 102, 104, 106 and 118 may be part of the server 108 or may be distributed databases external to the server 108.

Map database 102 stores map-related information such as map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zooming. The various map tiles are each associated with geographical locations, so that a device or system such as the business filtering system 108 may select, retrieve, transmit, and/or display one or more tiles in response to receiving one or more geographical locations.

The map information is not limited to any particular format. For example, the images may comprise street maps, aerial oblique images, satellite images, or a combination of these, and may be stored as vectors (particularly with respect to street maps), bitmaps (particularly with respect to satellite images), or flat files.

The map database 102 may store various types of map elements 208 as shown in FIG. 2. The map elements 208 may include features such as street segments, regions of geographic objects (e.g., a park region), geographic boundaries such as city or county boundaries, etc. The elements 208 may also include any type of detailed positional, geometric, relational, and meta information about known geographic entities (such as addresses, streets, parks, cities, states, countries).

The systems and methods in accordance with aspects of the invention may process locations expressed in different ways, such as latitude/longitude positions, street addresses, street intersections, a pair of x-y coordinates with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing.

Locations may be further translated from one reference system to another. For example, a geocoder may convert a location identified in accordance with one reference system (e.g., a street address such as "1600 Amphitheatre Parkway, Mountain View, Calif.") into a location identified in accordance with another reference system (e.g., a latitude/longitude coordinate such as 37.423021°, −122.083939°). A location may be associated with absolute values such as latitude/longitude and/or relative values in any scale. Moreover, even if a first type of information is used (such as storing the latitude, longitude and altitude of the camera and surface), information of another type may be generated from it (such as using differences between latitude/longitude positions and altitudes to calculate distances). In that regard, it will be understood that exchanging or processing locations expressed in one reference system, such as street addresses, may also be received or processed in other references systems as well.

Database 104 stores information related to business listings 210 that may be associated with the map data in database 102. Business listings 210 may include private businesses such as shops, restaurants, real estate agents, etc. These listings may be provided by business owners or other suppliers through online business directory services. Information related to these businesses may include an initial approximate location of each business, names and addresses of each business, the type or category of business, and/or other information related to each business. One or more business listings 210 may be provided through various user applications, (for example, through a search engine result page in response to a user's search query or through a map application in response to a user's location request) to the users of devices such as 120.

In one example, database 106 stores image data 212 associated with the map data in database 102 and the business listing data in database 104. The image data 212 may include imagery of a business in database 104, points of interest, streets, city blocks, regions, states, etc. Such imagery may be taken by various types of devices and stored in various formats as noted above. The image data 212 may be provided to the user devices, such as device 120, together with map data and the business listing data.

The image data 212 desirably includes street level images. Street level images comprise images of objects at geographic locations, captured by cameras in a direction generally parallel to the ground. Thus, as shown in exemplary street level image 300 in FIG. 3, street level image data may represent various geographic objects such as buildings 305-325, sidewalks 330-335 and streets 340-345 from a perspective of a few feet above the ground and looking down the street. It will be understood that while street level image 300 only shows a few objects for ease of explanation, a typical street level image may contain many objects such as street lights, signs, buildings, vehicles, people, mountains, trees, bodies of water, etc.

In one example, a street level image may be captured by a camera mounted on a vehicle, at a camera angle pointing roughly parallel to the ground and from a camera position at or below the legal limit for vehicle heights (e.g., 7-14 feet). Other street level images may be taken by people walking along a sidewalk or the like. Street level images are not limited to any particular height above the ground. For example, a street level image may be taken from the top of building.

The street level images tend to be taken at desired viewpoints at discrete locations. Separate images may be stitched together to form a horizontal strip to provide the appearance of a continuous image to browse.

Interactive panoramas may be obtained by stitching individual images from different camera angles, representing these images in certain specific map projections, such as an equirectangular projection, and serving the images through a panoramic player after performing a series of image transformations or other known image processing techniques.

Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images are typically associated with information indicating the orientation of the image. For example, if the street level image comprises a typical photograph, the orientation may simply be the camera angle. the camera angle may be represented as an angle that is 30° East of true North and rises 2° from ground level. If the street level images are panoramic images, such as 360° panoramas centered at the geographic location associated with the image, the orientation may indicate the portion of the image corresponding with looking due North from the camera position at an angle directly parallel to the ground. Street level images may also include videos, for instance MPEG.

The business listing filtering 108 utilizes data from databases 102, 104 and 106 and performs various functions in accordance with aspects of the invention. Business listing filtering system 108 may generate one or more business filtering signals to process the listings. For example, the system may determine whether a business listing is spam or whether a business is closed, and filter out these undesirable business entries to make the listings more reliable. For each business listing in business listing database 104, the filtering system 108 may find a correlation between the business listing and an image from the imagery database 106. Specifically, business listing filtering 108 may, based on the approximate geographic locations of each business listing and a geolocation associated with each image, correlate selected images in the imagery database 106 to relevant business listing in the business listing database 104. Images related to a specific business listing may include photographs taken for that particular business (e.g., with the business at the center of the image), photographs taken for the nearby points of interest or for the surrounding neighborhood, street level images of the nearby streets, etc.

Sometimes, one or more images associated with a business may be corrupted or for other reasons can no longer be retrieved from the associated databases (e.g., the street view database and/or the map database). In this situation, systems and methods may query the relevant databases (e.g., imagery database 106) for other street view images, look for the street view images of the nearest streets, and associate these nearest street view images to the business listing.

For a business listing, if the business sign or the address of the building is determined to be legible and recognizable from an image, the system may construct a "viewcode". A viewcode is a correlation between a point of interest such as a business and an image having a known location. The location may be a "rough" location such as within a city block, or a more specific location such as a pair of latitude/longitude coordinates. The viewcode may be stored as a data structure. The data structure may be used as an effective signal to indicate the existence of the business at the time when the image was captured.

For each viewcode, the business listing filtering system may also determine and store a vantage point from which the business was brought into view of the street view image. When a vehicle mounted with a camera is used to capture the street view images, the system may also determine and store a distance from the vehicle to the building for each viewcode. The system may also determine and store the dimension (e.g., the height and width) of the business's sign or storefront. These and other pieces of information (such as the vehicle's location) may be used to determine the location information of the image, as well as the visibility, the prominence and other relevant information about the business in the image. The viewcode data structure may also include timing information related to the image, for example, the date and the time at which the image was captured. Types of businesses that are stored in separate data structures may be associated with respective viewcodes of the business listings, or alternatively may also be included in the viewcode data structures. For example, certain classes or categories of businesses that are statistically biased to being spam may be indicated in the data structure. One such class/category is locksmiths. Viewcodes may be further processed to incorporate or associate with other data formats and be used by various systems or services for purposes such as improving the geolocation of the point of interest utilizing a 3D façade depth map or a fixed depth in the absence of 3D façade.

Figure 3:
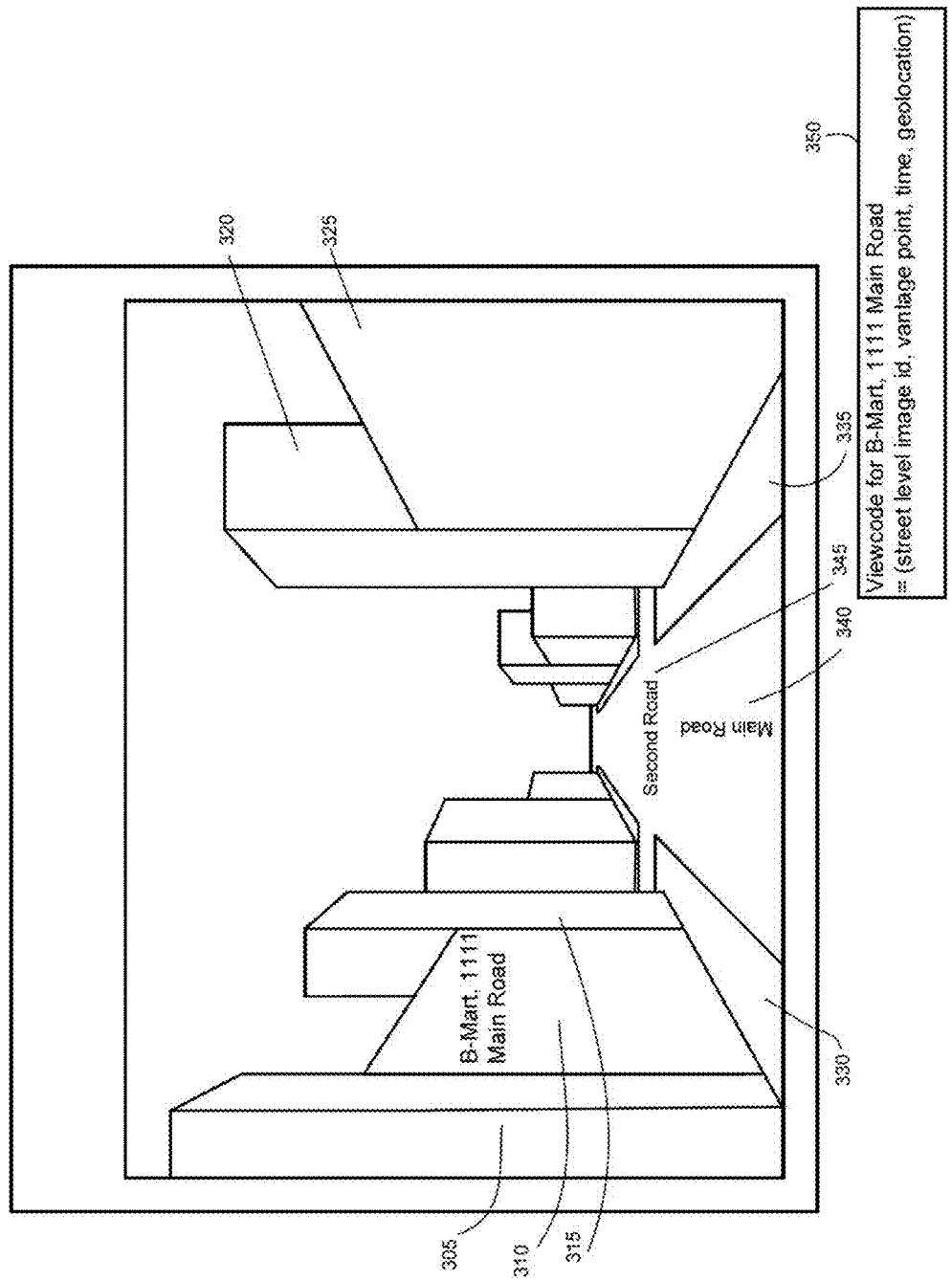
FIG. 3 is an exemplary street level image used to generate spam signals in accordance with aspects of the invention.

As an example illustrated in street image 300 of FIG. 3, business "B-Mart" in building 310 is located on "1111 Main Road". The viewcode for business listing "B-Mart, 1111 Main Road" may have a data structure similar to structure 350 with the street level image ID, a vantage point, time when the image was captured and geolocation data associated with image.

Returning to FIG. 1, the filtering system 108 may use the viewcodes as a spam signal 110, a closed business signal 112, or a ranking signal 114 to filter or rank the business listings. For example, the business listing which has a signal indicating a visible storefront may be flagged as with a high possibility of not being spam. The timing information in the signal may help to determine if a particular business is closed or open at the time when the image was taken. For example, a viewcode from a time-stamped image may be used indicate that a business was not closed at the time when the image was captured. In another scenario, the viewcode can be used to override the system bias that a given listing is spam. Therefore, if a viewcode associated with a given locksmith listing is used to determine that the given listing is a business operating at the indicated location, the system may ignore any bias/weighting and identify that locksmith as a valid business.

The system may also determine the degree of prominence of a business based on the dimension of the storefront or the business sign in a street view image associated with the business (e.g., the best image of the business). As such, a plurality of business listings may be ranked based on their prominence or importance. The rankings may be used in the mapping applications when returning results to a search query or when choosing which businesses to display more prominently than others on the map. Sometimes, the system may determine that the spam signals 110 and the closed business signals 112 are false positives based on the timing information related with the business listings, with the correlated images and with the viewcodes for the business listings. The spam signals 110 or the closed business signals 112 determined to be false positives may be flagged as such or be removed from the signals before applied to the business listings. Alternatively, these false positives may be separately stored as another set of signals for various kinds of use (e.g., be used as reference signals for other spam filtering systems).

The filtering system 108 may remove the businesses that are determined to be spam or closed from the original business directories, e.g., business listing database 104. The filtered and ranked business directories may be stored into database 118 by the system. Results may be provided to the user device 120 from the filtered business listings 118 in response to a query or other request. Alternatively, the system may be configured to provide the users with additional flags or warnings for the business listings determined to be spam or determined to have a high possibility of being spam or being closed.

The business filtering signals may also be used as inputs to evaluate other spam filtering system not based on street level images or be used as references to aid manual review of these spam filtering systems. In one example, the operator system 122 may comprise one or more operation terminals which may be operated by human operators to manually review and modify a particular spam filtering process based on the spam signals 110, closed business signals 112 and the false positive signals 116.

Returning to FIG. 2, the business filtering system 108 may be a computer (server) that contains a processor 202, memory 204 and other components typically present in general purpose computers. Processor 202 may be any conventional processor, such as off the shelf processors from Intel Corporation or Advanced Micro Devices. Alternatively, the processor may be a dedicated device such as an ASIC.

Memory 204 stores information accessible by processor 202, including instructions 218 that may be executed or otherwise used by the processor 120. It also includes data 206 that may be retrieved, manipulated or stored by the processor. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

Data 206 may be retrieved, stored or modified by processor 202 in accordance with the instructions 218. For instance, although the system and method is not limited by any particular data structure, the data may be stored in computer registers, in one or more relational databases as tables having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

As illustrated, data 206 may include the map database 102, the imagery database 106, and the business listings database 104. These databases may reside on computer 108, or may be distributed over the network as shown in FIG. 1. Processor 202 may execute instructions 218 to access these databases and retrieve data therefrom. Data 206 may also include business filtering signals 214 generated for the business listings, such as open or closed business signals, spam business signals, prominence or ranking signals and false positive signals, including the signals 110-116 as shown in FIG. 1. Spam score database 216 may store scores to indicate the spam level of a user account or profile. The spam scores and the business listings associated with a user account may be stored in the same database 216, or alternatively, may be stored in separate databases entities.

Although FIG. 2 functionally illustrates the processor and memory as being within the same block, it will be understood that the processor and memory may actually comprise multiple processors and memories that may or may not be stored within the same physical housing. For example, memory may be a hard drive or other storage media located in a server farm of a data center. For another example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel. Accordingly, references to a processor or a computer or a memory will be understood to include references to a collection of processors or computers or memories that may or may not operate in parallel.

The computer 108 may be at one node of a network 90 and capable of directly and indirectly communicating with other nodes of the network. For example, computer 108 may send spam scores from the spam score database 216 and any associated user instructions to another computer such as user device 228 located at another node of the network. In another example, computer 108 may send any false positive signals generated by instruction 222 to the operation terminal 226, which may be one of many computer terminals operated by the operators in the operator system 122 in FIG. 1.

Server 108 may also comprise a plurality of computers that exchange information with different nodes of a network for the purpose of receiving, processing and transmitting data to the operation terminals. In this instance, the user devices and the operation terminals will typically still be at different nodes of the network than any of the computers comprising server 108.

As indicated above, operation terminal 226 may be one of many computer terminals operated by the human operators in the operator system 122 in FIG. 1. Each operation terminal 226 may be configured similarly to server 108 and intended for use by a human operator in the operator system 122 and may have all of the components normally used in connection with a computer such as a central processing unit (CPU), memory (e.g., RAM and internal hard drives) storing data and instructions such as a web browser, a street view flash player, business listing management, spam filtering, etc.

Network 90, and intervening nodes between server 108, user device 226 and operation terminal 228, may comprise various configurations and use various protocols including local area network, virtual private networks, local Ethernet networks, private networks using communication protocols proprietary to one or more companies, cellular and wireless networks (e.g., WiFi), HTTP and SMTP, and various combinations of the foregoing. Although only a few computers are depicted in FIGS. 1-2, it should be appreciated that a typical system can include a large number of connected computers. Such communication may be facilitated by any device capable of transmitting data to and from other computers, such as Ethernet network interfaces, T1 lines, fiber optic cables, and/or wireless interfaces.

Although certain advantages are obtained when information is transmitted or received as noted above, other aspects of the system and method are not limited to any particular manner of transmission of information. For example, in some aspects, information may be sent via a medium such as a disk, tape, CD-ROM or solid-state memory such as a flash drive. In other aspects, the information may be transmitted in a non-electronic format and manually entered into the system. Yet further, although some functions are indicated as taking place on a server and others on a client, various aspects of the system and method may be implemented by a single computer having a single processor.

Operations in accordance with aspects of the invention will now be described with reference to FIGS. 4-6. It should be understood that the following processes do not have to be performed in the precise order described below. Rather, various operations can be handled in a different order or simultaneously. It should also be understood that these operations do not have to be performed all at once. Rather, some operations may be performed separately from other operations. In addition, other operations may be included or omitted from the various processes.

Figure 4:
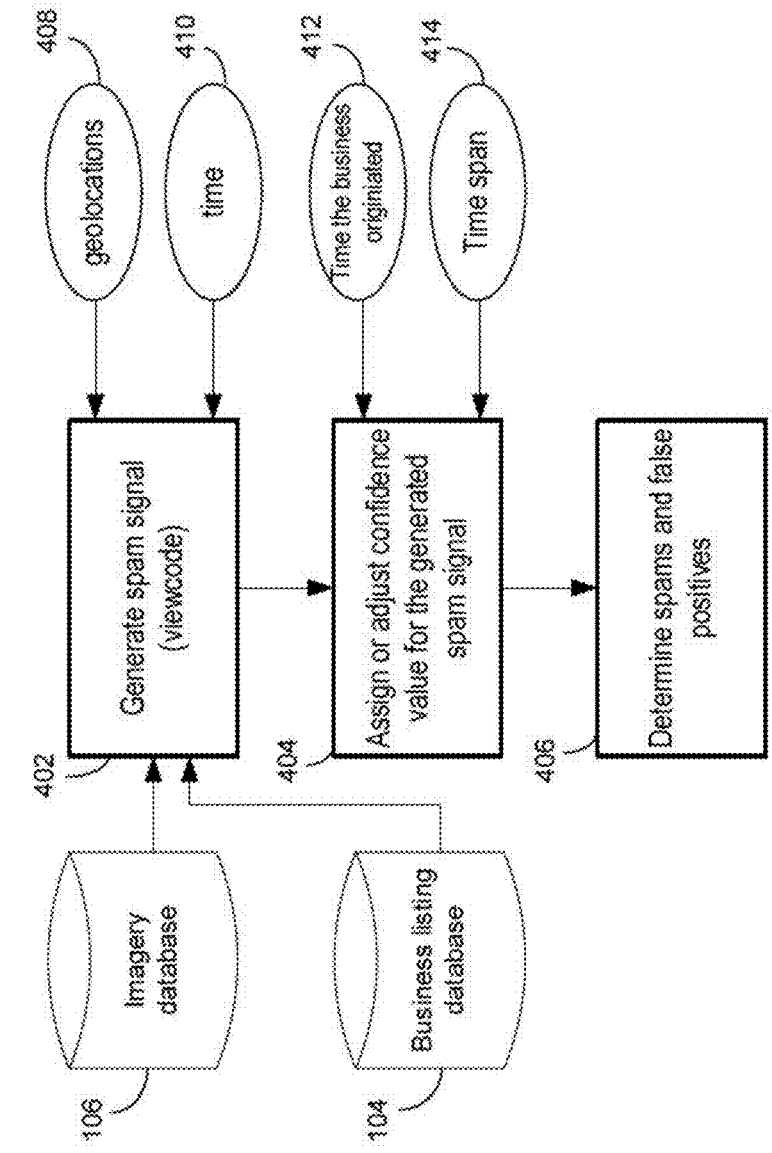
FIG. 4 is a system process chart in accordance with aspects of the invention.

FIG. 4 illustrates an exemplary system process 400 for determining spam business listings and reducing false positives in accordance with aspects of the invention. As shown in block 402, the business filtering system may generate a spam signal for a business listing in database 104 by structuring a viewcode that associates the business listing with one or more images related to the business in the imagery database 106. The viewcode generated for the business listing may also include geolocations 408 and timing information 410 associated with the images. Although not shown, other information related to the image or the business listing may also be incorporated into the viewcode.

As previously described, when a listing of a particular business (e.g., business A) has an address at which a different business (e.g., business B) is found in an image or in a viewcode, the business filtering system may determine that the listing of business A is a spam entry or has been closed. The system may then filter out business A accordingly. Sometimes, this determination may lead to a false positive result. For example, at time 0, an image was captured and business B is found in the image. At time 1, business B closed and business A opens at the same address. At time 2, the business filtering system uses the viewcode from time 0 and determines that business A is spam or a closed business.

As such, systems and methods of the invention provide various kinds of cues to reduce the rate of false positives. For example, in block 404, the business filtering system may assign or adjust confidence values for the spam signal generated in block 402 by taking into account various factors, such as the time when the business was established at the current address (block 412) and the time span (block 414) from which the viewcode was generated to present. For one example, if a date at which business A originated is available from a reliable data source, the business filtering system may be configured to discard the viewcode generated for business B. Alternatively, the system may be configured to assign a low confidence value to the viewcode of business B or to send the viewcode to an operator system (such as system 122 in FIG. 1) for manual review. As such, business A will not be automatically determined to be spam and be filtered out.

In another example, the system may be configured to decrease the confidence value assigned to the viewcode of a business as the time since the image was captured. For example, the default confidence value assigned to the viewcode of business B may be set as "1" and be gradually decreased after each passing month or another predetermined time period. The step of decreasing may be made at a fixed amount (e.g., a subtraction of 0.1) or be based upon an exponential decay (e.g., a reduction by 20%). The filtering system may also be configured to take other factors or signals into determining decreasing the confidence value. In block 406, the system may determine if a business is spam or if the determined spam business is a false positive based on the confidence value or the combination of the confidence value and other factors or signals.

Figure 5:
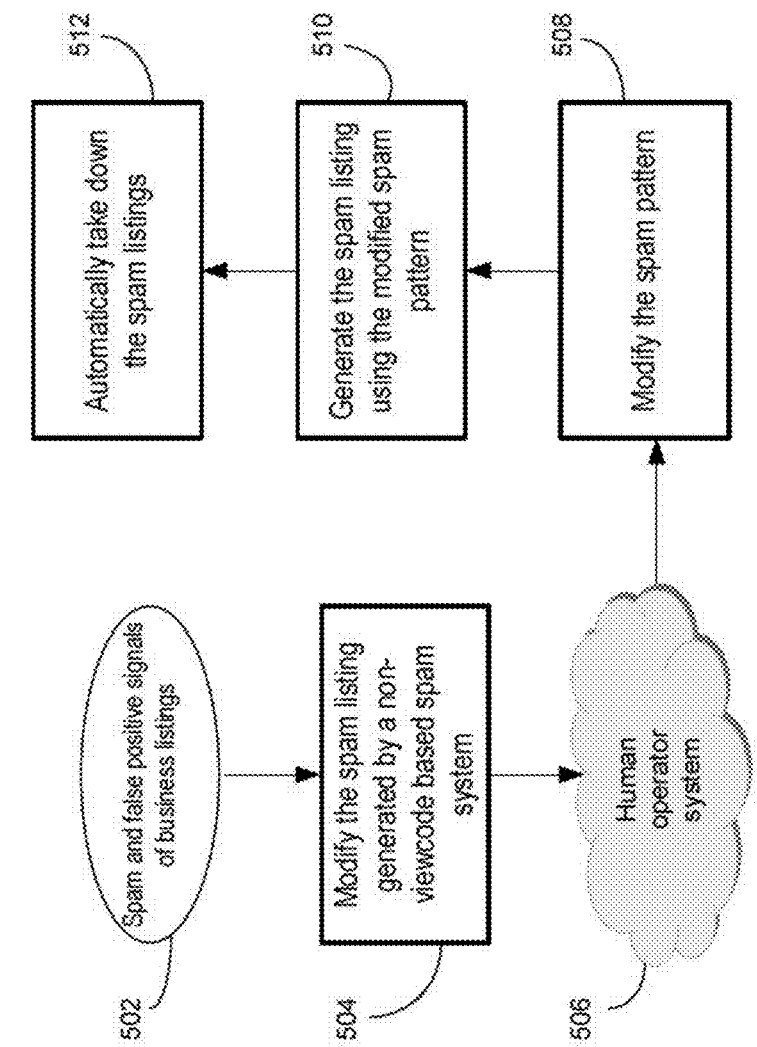
FIG. 5 is another system process chart in accordance with aspects of the invention.

FIG. 5 illustrates a system process 500 where viewcode-based spam signals may be used to improve the performance of other spam filtering systems. In block 504, the viewcode-based spam signals 502 may be used to modify a spam listing generated by a non-viewcode based spam system. For example, the non-viewcode based spam system may employ one or more spam patterns to filter business listings. These patterns may be obtained, for example, by collecting and processing user-contributed data through various web applications or online services. Each pattern may be used to generate a group of spam business listings which are to be automatically removed from the business listing databases. As previously mentioned, the viewcode-based signals may indicate that the business sign or the address of the building where the business resides has been found to be legible and recognizable in one or more geocoded images. Thus, a viewcode-based signal may be used as a verification of a non-spam business and be used to flag or highlight those listings which are likely to be false positives.

A human operator system 506 may use the modified listings to review and refine the spam patterns in block 508. Alternatively, an automated operator system or hybrid system may also review and refine the spam patterns. In block 510, the system may generate new spam lists using the improved spam patterns and in block 512 the system may automatically remove this spam from the business listing database such as database 104. As such, more accurate business listings with improved false positive rates may be provided to users, for instance in response to queries or search requests. Process 500 may be used to assess or analyze newly developed spam patterns, or may be used to fine tune or periodically review the effectiveness an existing spam pattern.

Figure 6:
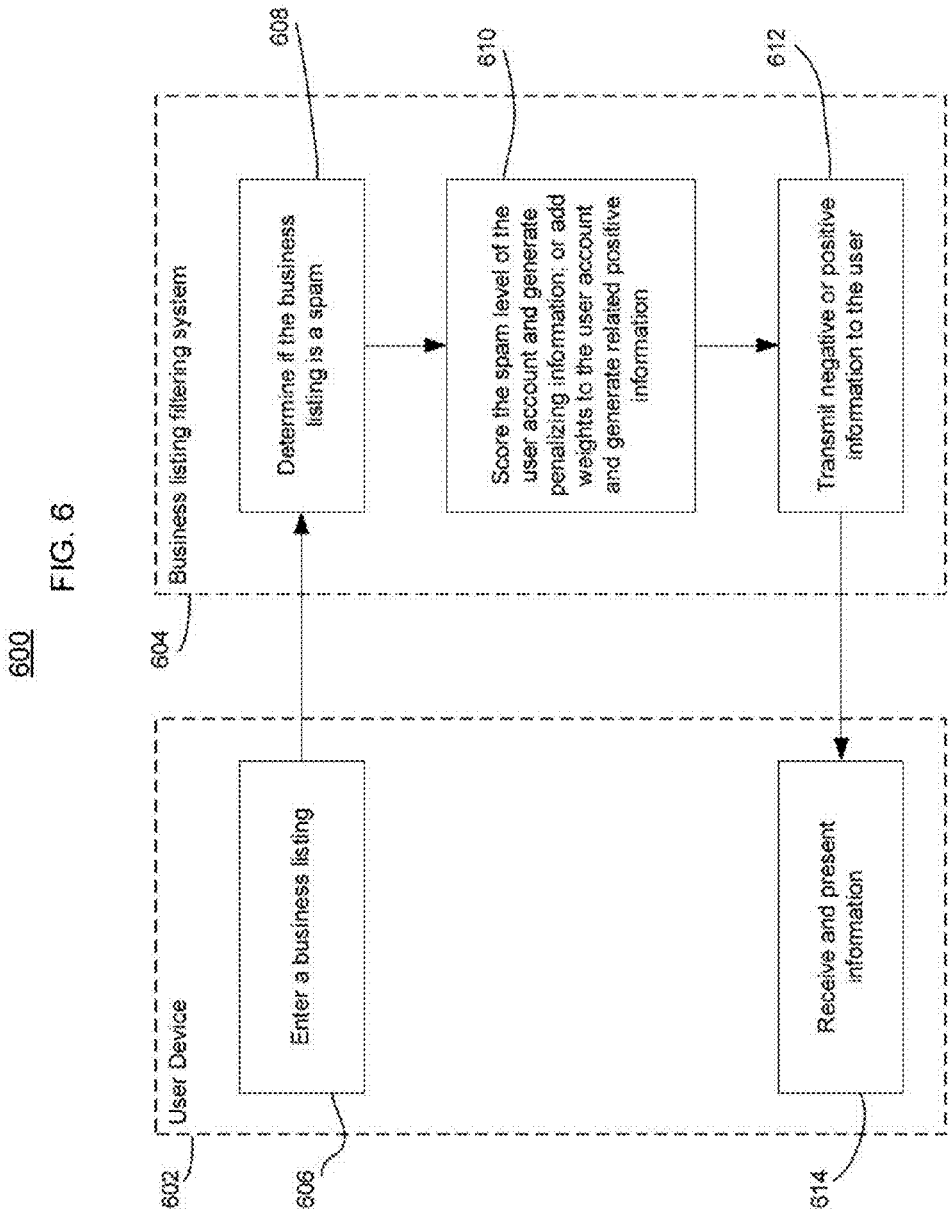
FIG. 6 is a flow chart in accordance with aspects of the invention.

FIG. 6 illustrates a flow chart 600 for scoring a spam level for a user account using spam signals in accordance with aspects of the invention. The user of the device 602 may open a user account with an online business directory service. Business listing filtering system 604 analyses business listings to determine whether any are spam, and may communicate that information back to the user device 602 or to other user devices. In block 606, the user may enter one or more business listings. The business listing filtering system may, in block 608, determine if the business listings entered by the user are spam by using the viewcode-based spam signals as discussed herein. The determination may also be based upon the combination of the viewcode-based spam signals and the other types of spam signals.

In block 610, the system may evaluate the amount of spam listings in the user account and generate negative or positive weights to the spam score of the user account. If the user account has a sufficient amount of spam listings or the spam score has enough negative weights (e.g., on or above a predetermined threshold), the system may generate penalizing information accordingly. The system may also take other action such as to remove a spam listing from its database or flag the listing as likely to be spam. The content of the penalizing information or action may depend on the nature and severity of the spam, which may include warnings or notifications to the user asking the user account to be cleaned, or involve locking the user out of their account with or without further notifications.

In block 610, the system may alternatively generate positive weights for the user's spam score if the determination in block 608 indicates that the listings have been verified with one or more street view images and viewcodes. Positive information such as reinstatement notification to a user may be generated here. This process helps to prevent a user from being penalized and to timely notifying the user about the reinstatement. Thus, even though a listing may initially be considered to be spam because it is of a certain type or category of listing (e.g., a locksmith listing), the system may positively weight the listing to overcome any initial bias. In block 612, the positive or negative information is then transmitted to the user device where the information is received and presented in block 614.

Systems and methods according to aspects of the invention are not limited to particular businesses or any specific points of interest, nor are they limited to street view images or panoramas; rather, they may be used for any desired geographic location point with any suitable image data.

It will be further understood that the sample values, types and configurations of data described and shown in the figures are for the purposes of illustration only. In that regard, systems and methods in accordance with aspects of the invention may include various types of networks, transmission devices, operation terminals, servers, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any method for determining and adjusting the confidence value for a spam signal may be employed in any configuration herein. Each way of ranking the business listings based on the vantage points may be used in any configuration herein. Any user device operation terminal may be used with any of the configurations herein. Any data structure for associating a business listing with one or more images with a geographic object may be employed.

The invention claimed is:

1. A method of determining if a business listing is a valid business listing, the method comprising:
receiving a business listing that contains geolocation information and the name of a business;
receiving an originating time of the business that identifies when the business was set up at an address indicated by the geolocation information of the business listing;
receiving an image related to a geographic object initially associated with the business listing;
receiving timing information related to when the image was captured;
verifying, with a processor, if the geographic object is actually associated with the business by comparing the geolocation information of the business listing with location information of the image; and
if the business listing is not associated with the location information of the image, determining with the processor that the business listing is spam or is a closed business, wherein the determination is based at least in part on whether the originating time is after the timing information.

2. The method of claim 1, further comprising:
assigning a confidence value to the verification; and
decreasing the confidence value as a time span from when the image was captured increases; and
wherein the business listing is determined to be spam or is closed based on the decreased confidence value.

3. The method of claim 2, wherein decreasing the confidence value comprises decreasing based on a fixed predetermined value.

4. The method of claim 2, wherein decreasing the confidence value comprises decreasing based on an exponential decay.

5. The method of claim 1, further comprising:
adjusting a score of an account related the business listing, wherein the adjusting is performed based on the determination that the business listing is spam or is a closed business and if one or more other business listings received from the account have been identified to be spam or closed businesses; and
transmitting information regarding the account to a user device based on the adjusted score.

6. The method of claim 5, wherein the transmitted information comprises a notification to a user to remove any business listings determined to be spam or closed businesses.

7. The method of claim 5, wherein the transmitted information comprises a locking or a shutting down of the account.

8. A method of determining if a business listing is a valid business listing, the method comprising:
receiving a business listing that contains geolocation information and the name of a business;
receiving an originating time of the business indicating when the business was set up at an address indicated by the geolocation information;
receiving one or more images, each respective image including a geographic object in the image;
constructing a viewcode for each respective one of the received images, the viewcode is a data structure comprising at least an identifier of the geographic object, location information of the respective image, and timing information regarding a time when the image was captured;
searching, with a processor, among the constructed viewcodes for a first viewcode, where the identifier of the first viewcode indicates that the geographic object is the business and the location information of the image is related to the geolocation information of the business;
if the first viewcode is found, determining with the processor that the business listing is valid or is an open business; and
if the first viewcode is not found, determining with the processor that the business listing is invalid or is a closed business, wherein the determining includes determining whether the originating time occurred after the timing information.

9. The method of claim 8, further comprising:
finding, with the processor, the first viewcode, where the identifier of the first viewcode indicates that the geographic object is actually another and different business listing; and
determining that the other, different business listing is valid or is an open business.

10. The method of claim 8, wherein the location information of the image indicates a geolocation at or near the geolocation of the business.

11. The method of 8, further comprising:
generating a weighting factor based on a type of the business listing; and
determining if the business listing is either valid or spam, and is either an open business or a closed business, based on the weighting factor.

12. The method of claim 11, further comprising modifying the determination based on the weighting factor.

13. A system of determining if a business listing is spam, the system comprising:
a processor; and
a memory coupled to the processor, the memory storing instructions executable by the processor, the instructions comprising:
receiving a business listing that contains geolocation information and the name of a business;
receiving an originating time of the business, wherein the originating time is the time when the business was set up at an address indicated by the geolocation information of the business listing;
receiving an image related to a geographic object initially associated with the business listing;
receiving timing information related to the image, the timing information includes a time when the image was captured;
verifying if the geographic object is actually associated with the business by comparing the geolocation information of the business listing with location information of the image; and
if the business listing is not associated with the location information of the image, determining with the processor that the business listing is spam or is a closed business, wherein the determining is based at least in part on whether the originating time is after the timing information.

14. The system of claim 13, further comprising instructions for:
assigning a confidence value to the verification;
decreasing the confidence value as time span from when the image was captured increases; and
wherein if the business listing is determined to be spam or is closed based on the confidence value.

15. The system of claim 14, wherein decreasing the confidence value comprises decreasing based on a fixed predetermined value.

16. The method of claim 15, wherein decreasing the confidence value comprises decreasing based on an exponential curve.

17. The method of claim 13, further comprising:
adjusting a score of an account related to the business listing, wherein the adjusting is performed based on the determination that the business listing is spam or is a closed business and if one or more other business listings received from the account have been identified to be spam or closed businesses; and
transmitting information regarding the account to a user device based on the adjusted score.

18. The method of claim 17, wherein the transmitted information comprises a notification to a user to remove any business listings determined to be spam or closed businesses.

* * * * *